United States Patent [19]
Fergason

[11] 3,885,982
[45] May 27, 1975

[54] LIQUID CRYSTAL COATING

[75] Inventor: James L. Fergason, Kent, Ohio

[73] Assignee: G. J. Roush, Seattle, Wash.

[22] Filed: Aug. 17, 1970

[21] Appl. No.: 64,602

Related U.S. Application Data

[63] Continuation of Ser. No. 737,880, June 18, 1968, abandoned.

[52] U.S. Cl.................................. 106/252; 117/167
[51] Int. Cl.............................................. C08h 9/00
[58] Field of Search ......... 424/38; 106/252; 23/230, 23/252; 117/107

[56] References Cited
UNITED STATES PATENTS

| | | | |
|---|---|---|---|
| 2,373,763 | 4/1945 | Kuever et al. | 424/38 |
| 3,114,836 | 12/1963 | Fergason | 250/83 |
| 3,409,404 | 11/1968 | Fergason | 252/408 |

FOREIGN PATENTS OR APPLICATIONS

1,041,490  9/1966  United Kingdom

OTHER PUBLICATIONS

Chem. Abstract, Vol. 51: 3259, 1956.
Chemical Abstract, 67:11184c, 1967.
Chemistry of Organic Compounds, Noller, p. 209.
Chem. Abst., 51: 11732d.
Condensed Chem. Dict., 1965, pp. 670–671.
Chemical Abstract, 67: 118,417c, 1967.

*Primary Examiner*—Theodore Morris
*Attorney, Agent, or Firm*—Brown, Murray, Flick & Peckham

[57] ABSTRACT

Liquid-crystal materials, especially the cholesteric, are protected against dust, contamination, etc. by being provided with a coating in accordance with a method involving mixing the liquid-crystal material with a monomer, such as tung oil, in which it is soluble but which will polymerize at a liquid-gas interface to form a polymer insoluble in the liquid-crystal material. The method is more convenient and less costly than other practices hitherto used, such as gelatin microencapsulation.

4 Claims, 1 Drawing Figure

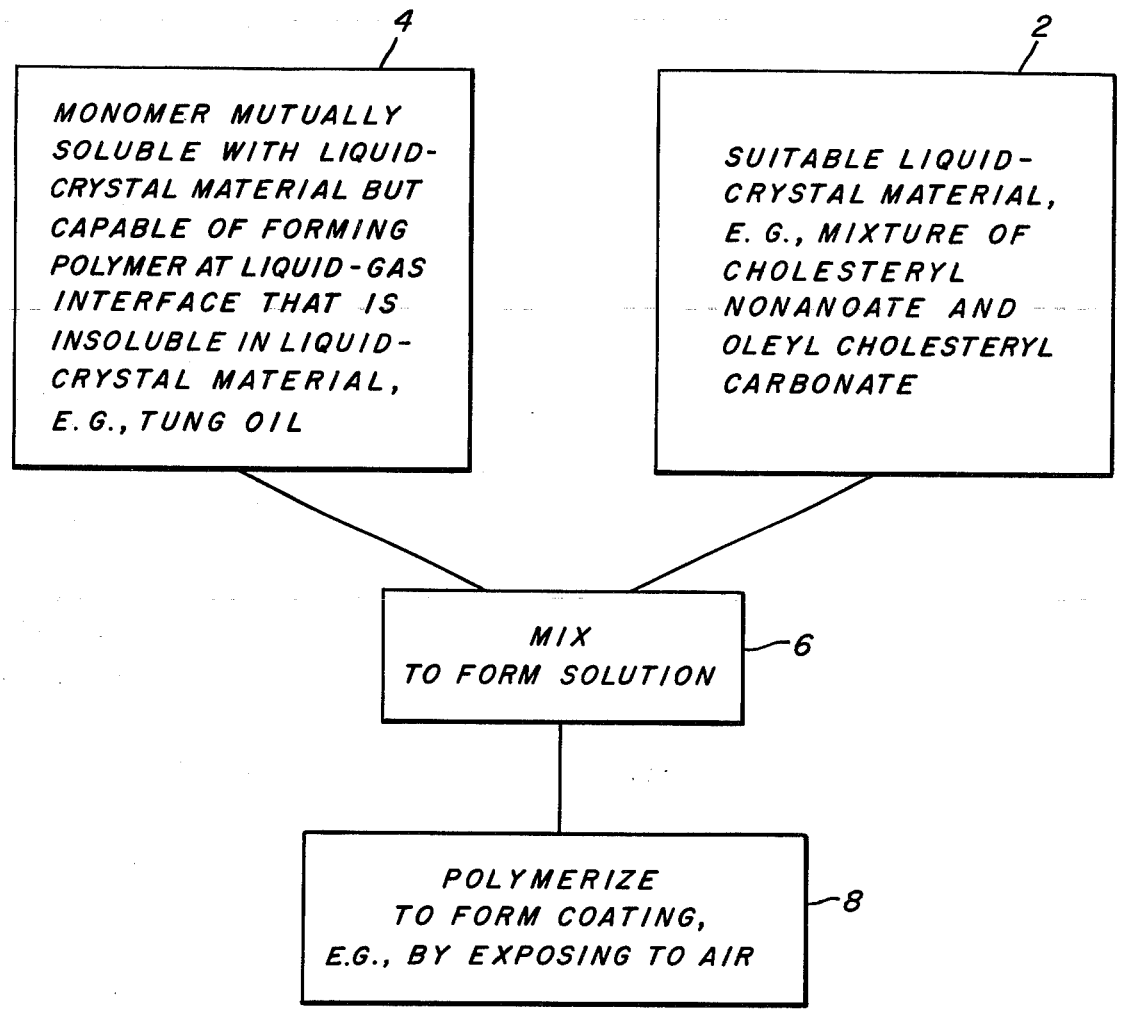

LIQUID CRYSTAL COATING

CROSS REFERENCE TO RELATED APPLICATION

This application is a continuation of U.S. Ser. No. 737,880, filed June 18, 1968, now abandoned.

BACKGROUND OF THE INVENTION

1. Field of the Invention:

This invention relates to a method of providing a liquid-crystal material with a coating to protect it against dust or other contaminants, to a composition of matter for use in practicing such method, and to articles made with the use of such method.

2. Description of the Prior Art:

Certain chemical compounds have the property that, when brought to an appropriate temperature, they are in a liquid state and at the same time they behave in ways that show that the molecules of the liquid are not randomly arranged, as in the ordinary (isotropic) liquid, but in crystals such as are most commonly encountered in the solid state. These crystals take different forms, and have been classified into the nematic, the smectic, and the cholesteric. Substances that exhibit liquid crystals also usually at higher temperatures exhibit an isotropic-liquid phase. The cholesteric-phase liquid-crystal materials are of particular interest, since they have the interesting property of "selective scattering" mentioned in my earlier U.S. Pat. No. 3,114,836. That is, they will, as thin films, show different apparent colors, depending upon the temperature of the material. Such a film can be used for temperature mapping of a surface, one possible use being in the detection of breast cancer.

In some instances, the cholesteric-phase liquid-crystal materials have been used without any protection against dust or other contaminants. The organic compound or compounds involved are mixed with and dissolved in benzene, petroleum ether, or other suitable solvent and poured onto a surface, and the solvent evaporates to leave a thin film, perhaps 10 to 50 microns thick, of the material.

In other instances, the liquid-crystal film so made is covered with a transparent stratum, such as a layer of plastic or of spray lacquer. Another known practice involves microencapsulation in gelatin. The above-mentioned practices are disadvantageous, involving one or more processing steps that are not required when the present invention is practiced.

BRIEF SUMMARY OF THE INVENTION

I have discovered that by mixing with a liquid-crystal material another substance that is mutually soluble with the liquid-crystal material and is at the same time a monomer that is capable of polymerizing at a liquid-gas interface to form a polymer that is insoluble in the liquid-crystal material, I can conveniently make a composition of matter that will have, for example, the advantages of liquid-crystal material microencapsulated in gelatin. Tung oil may conveniently be used as the solvent-monomer.

BRIEF DESCRIPTION OF THE DRAWING

A complete understanding of the invention may be obtained from the foregoing and following description thereof, taken together with the appended drawing, the sole FIGURE of which is a flow diagram of the process of my invention.

DESCRIPTION OF THE PREFERRED EMBODIMENTS

In the drawing, there is indicated in the block 2 a liquid-crystal material. This may, as indicated, be a cholesteric-phase liquid-crystal material such as a mixture of cholesteryl nonanoate and oleyl cholesteryl carbonate, or any of a great number of other compounds or mixtures that yield cholesteric-phase liquid crystals. Reference may be had to British Pat. No. 1,041,490, lines 5-102 of page 4, for a substantial, but by no means exhaustively complete, list of materials known to exhibit cholesteric-phase liquid crystals. Moreover, the present invention also finds use with liquid-crystal materials of the nematic and the smectic types, but it is with reference to the cholesteric-phase liquid-crystal materials that the invention appears to have the greatest utility.

In the block 4, there is indicated another substance, a solvent-monomer. It may be mutually soluble with the liquid-crystal material of the block 2 and at the same time be capable of forming at a liquid-gas interface a polymer that is insoluble in the liquid-crystal material. The polymer that is to be formed should, advantageously, be present in a very thin layer so that the polymer layer will be transparent or translucent, i.e., substantially light-transmitting, in order that it may remain possible to continue to observe the color of the liquid-crystal material. Tung oil is satisfactory for the material of the block 4, where the material of the block 2 is, as indicated on the FIGURE, a mixture of cholesteryl nonanoate and oleyl cholesteryl carbonate. Other drying oils such as linseed oil, citicica oil, or perilla oil may be used. Various other substances contained in such drying oils, or chemically similar to such substances, may be used in place of the tung oil. Among these may be mentioned linolenic acid, linoleic acid, oleostearic acid, glycerides thereof, and methyl eliostearate. These substances have in common that they are or contain unsaturated organic compounds that, upon exposure to oxygen, such as that of air, will polymerize to form molecules of high molecular weight, substantially insoluble in the liquid-crystal material.

Other monomers miscible with the liquid-crystal material, polymerizable to form materials insoluble in the liquid-crystal material, but caused to polymerize otherwise than by exposure to oxygen, e.g., by the use of heat, may also find use in some circumstances, but for the most part, it is most convenient to work with the oxygen-polymerized drying oils or similar substances.

One part by weight of material 2 is mixed with between 0.25 and 9 parts of material 4. Stated in other words, 10 to 80 weight percent of the liquid crystal material is mixed with 90 to 20 weight percent of the monomer drying oil. If the material 4 is a commercial drying oil containing, e.g., 50 percent solvent, one part of it is mixed with about 0.1 to 1 part by weight of material 2.

After the two components 2 and 4 are mixed, as indicated by the block 6 of the FIGURE, polymerization is permitted to occur, as indicated by the block 8. This is advantageously done by spreading or painting the material onto a surface that can be exposed to air or oxygen. The time required for the polymerization will depend upon the nature and proportions of the drying oil or the like used, as well as the temperature and the concentration of oxygen at the exposed surface. With tung oil, mixed in equal parts with cholesteric-phase liquid-crystal material, polymerization is substantially complete in about 5 to 15 hours.

The invention provides a technique for enclosing liquid crystals in a protective layer that is water-proof. The coating dries like ordinary paint to yield a hard surface. Flexible, protected liquid-crystal films can be made in this way. The invention affords a technique for supplying an "artist's paint" to have the properties of, for example, cholesteric-phase liquid crystals; this "paint" will permit the production of numerous interesting effects, as it may appear, for example, red at 20°C and violet at 30°C, with other colors of the visible spectrum being seen at the temperatures in between. Cholesteric-phase liquid-crystal compositions react to electrical fields as well as to temperature, and thus the invention affords a way of making uniform, permanent coatings for use in electric-field detection. Nematic-phase liquid crystals react in certain circumstances to electrical and/or magnetic fields, and the invention provides a way of making uniform, permanent coatings of such substances so that they may be used in the detection of such fields.

The invention described above is illustrated by the following specific examples.

EXAMPLE I

There was made a cholesteric-phase liquid-crystal material comprising, in percent by weight, 36 percent cholesteryl nonanoate, 36 percent oleyl cholesteryl carbonate, and 28 percent cholesteryl chloride. Three grams of this material were mixed with 10 grams of commercial tung oil containing 50 percent of solvent. The mixture was painted onto a surface and permitted to dry (polymerize) in air at room temperature for 10 hours. There was obtained a coating with a hard surface, red in color, that responded to an electric field in the same manner as, for example, a film made of the same liquid-crystal material by evaporation from a petroleum-ether solution.

EXAMPLE II

There was made a mixture of 5 grams each of oleyl cholesteryl carbonate, tung oil, and organic solvent (dimethylformamide). The mixture was applied to a surface and dried as indicated above in Example I. There was obtained a coating that changed color at 20°C and was water-proof.

EXAMPLE III

There was made a mixture of 4 grams para-azoxanisole, 5 grams tung oil, and 5 grams of aromatic solvent (dimethylformamide). The mixture was applied to a surface and dried as indicated in Example I. There was obtained a coating that contained nematic liquid crystals at 120°C to 137°C and was waterproof.

EXAMPLE IV

There was made a mixture of 2 grams cholesteryl nonanoate, 2 grams oleyl cholesteryl carbonate, and 5 grams tung oil. The mixture was applied to a surface and dried as indicated in Example I to form a water-proof stratum. There was obtained a coating containing cholesteric-phase liquid crystals and changing color at 37°C to 38°C.

Although I have shown and described above certain embodiments of my invention, I intend to cover as well any change or modification therein that may be made without departing from its spirit and scope.

I claim:

1. As a composition of matter, a mixture consisting essentially of 10 to 80 weight percent of a liquid crystal and 90 to 20 weight percent of a monomer drying oil miscible with the liquid crystal but capable of forming at a liquid-gas interface over the liquid crystal an essentially transparent hard surface polymer coating insoluble in the liquid crystal, the liquid crystal having the property of selective light scattering and being selected from the group consisting of cholesteric-phase liquid crystals and nematic-phase liquid crystals.

2. A composition as defined in claim 1, characterized in that said drying oil is selected from the group consisting of tung, linseed oiticica and perilla oils.

3. A method for obtaining a surface provided with a coating of a liquid crystal protected against moisture, dust and contaminants, said method comprising the steps of:

mixing 1 to 8 parts by weight of a liquid crystal with 9 to 2 parts by weight of a monomer drying oil miscible with the liquid crystal, the liquid crystal having the property of selective light scattering and being selected from the group consisting of cholesteric-phase liquid crystals and nematic-phase liquid crystals, applying said mixture to said surface to form a coated surface, and exposing said coated surface to air, whereby the molecular oxygen of said air polymerizes said drying oil to yield a uniform, permanent, hard surface flexible film insoluble in said liquid crystal, said film protecting the liquid crystal against moisture, dust and contaminants.

4. The method of claim 3 wherein said dyring oil is selected from the group consisting of tung, linseed oiticica and perilla oils.

* * * * *